(12) United States Patent
Jeanrenaud et al.

(10) Patent No.: US 11,625,007 B2
(45) Date of Patent: Apr. 11, 2023

(54) COMPOSITE COMPONENT FOR HOROLOGY OR JEWELLERY WITH A CERAMIC STRUCTURE AND INSERTS

(71) Applicant: Omega SA, Biel/Bienne (CH)

(72) Inventors: Frederic Jeanrenaud, La Chaux-de-Fonds (CH); Gregory Kissling, La Neuveville (CH)

(73) Assignee: Omega SA, Biel/Bienne (CH)

( * ) Notice: Subject to any disclaimer, the term of this patent is extended or adjusted under 35 U.S.C. 154(b) by 0 days.

(21) Appl. No.: 16/813,837

(22) Filed: Mar. 10, 2020

(65) Prior Publication Data

US 2020/0292999 A1 Sep. 17, 2020

(30) Foreign Application Priority Data

Mar. 14, 2019 (EP) ...................................... 19162931

(51) Int. Cl.
*G04B 47/04* (2006.01)
*C04B 37/00* (2006.01)
(Continued)

(52) U.S. Cl.
CPC ........... *G04B 47/042* (2013.01); *B05D 3/002* (2013.01); *C04B 37/008* (2013.01);
(Continued)

(58) Field of Classification Search
CPC ................ B05D 2504/00; B05D 3/002; C04B 2237/32; C04B 2237/407; C04B 37/008; B23K 26/382
See application file for complete search history.

(56) References Cited

U.S. PATENT DOCUMENTS 3,433,013 A * 3/1969 Willy ................... G04B 19/103
368/232
3,786,627 A * 1/1974 Takagi ................... G04B 19/12
368/232
(Continued)

FOREIGN PATENT DOCUMENTS

CN 1112361 A 11/1995
CN 1213439 A 4/1999
(Continued)

OTHER PUBLICATIONS

Japanese Office Action dated Feb. 16, 2021 in Japanese Patent Application No. 2020-040559 (with English translation), 11 pages.
(Continued)

*Primary Examiner* — Nathan H Empie
(74) *Attorney, Agent, or Firm* — Oblon, McClelland, Maier & Neustadt, L.L.P.

(57) ABSTRACT

A method for fabricating a composite component for horology or jewellery including making a base from a first material, with a first visible apparent surface, and a first support surface; a structure from a second ceramic, or sapphire or at least partially amorphous material, with a second apparent surface and a second support surface, including a through bore machined over the entire thickness thereof; at least one insert made of a third material, for each through bore, and arranged to fit together in a complementary manner with this through bore; bonding this base and each structure to each other, with each first support surface and each second complementary support surface bearing against one another; securing each insert with its respective through bore.

19 Claims, 2 Drawing Sheets

(51) Int. Cl.
  *G04B 19/10* (2006.01)
  *G04B 19/12* (2006.01)
  *G04D 3/00* (2006.01)
  *B05D 3/00* (2006.01)

(52) U.S. Cl.
  CPC .......... *G04B 19/103* (2013.01); *G04B 19/12* (2013.01); *G04D 3/0048* (2013.01); *G04D 3/0092* (2013.01); *B05D 2504/00* (2013.01); *C04B 2237/32* (2013.01); *C04B 2237/407* (2013.01)

(56) References Cited

U.S. PATENT DOCUMENTS

| | | | | |
|---|---|---|---|---|
| 4,388,350 | A | * | 6/1983 | Ayers ............... A44C 27/00 427/262 |
| 4,403,014 | A | * | 9/1983 | Bergmann ......... G04B 37/221 428/546 |
| 6,310,836 | B1 | * | 10/2001 | Fujii ............... G04B 19/12 368/205 |
| 6,466,522 | B1 | | 10/2002 | Yoshioka et al. |
| 2006/0062971 | A1 | | 3/2006 | Bourban et al. |
| 2010/0214882 | A1 | | 8/2010 | Bourban et al. |
| 2011/0051561 | A1 | * | 3/2011 | Fujisawa ............ G04R 20/04 368/47 |
| 2012/0244326 | A1 | | 9/2012 | Jeanrenaud et al. |
| 2013/0094333 | A1 | * | 4/2013 | Ito ................. G04C 10/02 368/239 |
| 2017/0031321 | A1 | | 2/2017 | Buttet |
| 2017/0038734 | A1 | | 2/2017 | Issartel et al. |

FOREIGN PATENT DOCUMENTS

| | | | |
|---|---|---|---|
| CN | 1267005 | A | 9/2000 |
| CN | 203101825 | U * | 7/2013 |
| CN | 104379539 | A | 2/2015 |
| CN | 105717775 | A | 6/2016 |
| CN | 106462106 | A | 2/2017 |
| CN | 106462111 | A | 2/2017 |
| CN | 207241274 | U | 4/2018 |
| CN | 207817425 | U | 9/2018 |
| EP | 1 640 822 | A1 | 3/2006 |
| JP | 51-82472 | U | 7/1976 |
| JP | 7-20585 | U | 4/1995 |
| JP | 7-104075 | A | 4/1995 |
| JP | 07104075 | A * | 4/1995 |
| JP | 10-160861 | A | 6/1998 |
| JP | 2003-240871 | A | 8/2003 |
| JP | 2007-86027 | A | 4/2007 |
| JP | 2008249450 | A * | 10/2008 |
| JP | 2017-517006 | A | 6/2017 |
| RU | 2012 111 045 | A | 9/2013 |
| TW | 200619422 | A | 6/2006 |
| TW | 201630683 | A | 9/2016 |
| WO | WO 2018/172895 | A1 | 9/2018 |

OTHER PUBLICATIONS

Combined Taiwanese Office Action and Search Report dated Nov. 13, 2020 in Taiwanese Patent Application No. 109105617 (submitting English translation only), 16 pages.
European Search Report dated Oct. 4, 2019 in European Application 19162931.0 filed Mar. 14, 2019 ((with English Translation of Categories of Cited Documents), 3 pages.
Combined Russian Federation Office Action and Search Report dated Oct. 14, 2020 in Patent Application No. 2020110391 (with English translation and English translation of Categories of Cited Documents), 16 pages.
Japanese Office Action dated Jun. 8, 2021 in Japanese Patent Application No. 2020-040559 (with English translation), 7 pages.
Combined Chinese Office Action and Search Report dated Apr. 22, 2021 in corresponding Chinese Patent Application No. 202010175945.2 (with English Translation of Category of Cited Documents), 11 pages.
Office Action dated May 24, 2021 in corresponding Korean Patent Application No. 10-2020-0030088 (with English Translation), 10 pages.
Final Office Action dated Nov. 3, 2021 in Korean Patent Application No. 10-2020-0030088 (with English translation), 8 pages.

* cited by examiner

COMPOSITE COMPONENT FOR HOROLOGY OR JEWELLERY WITH A CERAMIC STRUCTURE AND INSERTS

Cross-Reference to Related Application

This application claims priority to European Patent Application No. 19162931.0 filed on Mar. 14, 2019, the entire disclosure of which is hereby incorporated herein by reference.

FIELD OF THE INVENTION

The invention concerns a method for fabricating a composite component for horology or jewellery.

The invention also concerns a watch including an external element and/or a dial made by this method.

The invention also concerns a piece of jewellery comprising at least one jewellery component made by this method The invention concerns the field of external or display components for horology, and the field of jewellery.

BACKGROUND OF THE INVENTION

In a timepiece or piece of jewellery, it is usual to partition off certain areas to enhance a display or a particular component, for example a small chronograph counter or a date window on a calendar watch, or a precious stone setting, or otherwise.

The use of a composite structure with various assembled elements rarely takes advantage of the properties, especially the optical properties, of each element.

JP Patent No H0720585 in the name of KAWAGICHIKO PRECISION discloses a timepiece dial formed by bonding together a metal substrate and a decorative element like a shell, ceramic, precious stone, or sapphire. This decorative element has a cut out formed on the surface of the metal substrate of the cut part.

EP Patent No. 1640822 in the name of ASULAB discloses a dial with a ceramic base plate, whose surface comprises portions in relief forming hollows or protrusions. The surface and portions in relief are coated with enamel layers. The base plate is made of ceramic material and the portions in relief are made by pre-shaping the base plate prior to enamelling or by machining the enamel layer, through the latter, or through the base plate.

SUMMARY OF THE INVENTION

The invention proposes to take advantage of the different nature of the constituent elements of a composite component for horology or jewellery, to enhance certain functions or certain constituents of this component, for example to create a reflective or structured surface on a display.

To this end, the invention concerns a method for fabricating a composite component for horology or jewellery according to claim 1.

The invention also concerns a watch including an external element and/or a dial made by this method.

BRIEF DESCRIPTION OF THE DRAWINGS

Other features and advantages of the invention will appear upon reading the following detailed description, with reference to the annexed drawings, in which:

FIG. 1 represents, in an exploded view on three levels, the making of a base, of a structure made of hard material, and of inserts;

FIG. 2 represents a first machining operation of machining through bores in the structure, if they have not been made beforehand;

FIG. 3 represents a first assembly operation wherein the base and each structure are secured by bonding;

FIG. 4 represents a second assembly operation wherein each insert is secured to its respective through bore;

FIG. 5 represents a second machining operation wherein the upper surfaces of the insert are aligned on the same plane;

FIG. 6 represents a transfer operation of affixing and bonding decorative elements on a second apparent surface of the structure;

FIG. 7 represent a final coating operation wherein the structure and each decorative element carried thereby is coated with a surface layer deposition of a transparent treatment material in a PVD or lacquering or zapon varnishing process;

FIG. 8 represents, in a similar manner to FIG. 7, a final coating operation wherein the structure and each insert carried thereby are coated with a surface layer deposition of a transparent treatment material in a PVD or lacquering or zapon varnishing process.

FIG. 9 represents, in a similar manner to FIGS. 7 and 8, a final coating operation wherein the structure and each decorative element and each insert carried thereby are coated with a surface layer deposition of a transparent treatment layer in a PVD or lacquering or zapon varnishing process.

FIG. 10 represents a final machining operation wherein shape machining operation is performed on the surface layer and/or a polishing operation is performed on the external surface of the surface layer;

FIG. 11 represents, in a similar manner to FIG. 6, an operation of pad printing markings on a second apparent surface of the structure;

DETAILED DESCRIPTION OF PREFERRED EMBODIMENTS

Figure 1:
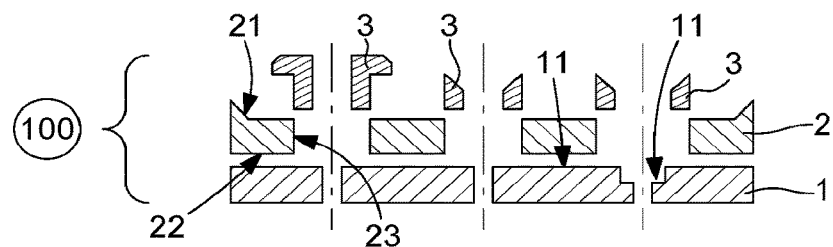
FIGS. 1 to 11 represent schematic sectional views of the operating sequences of a method according to the invention.
Figure 2:
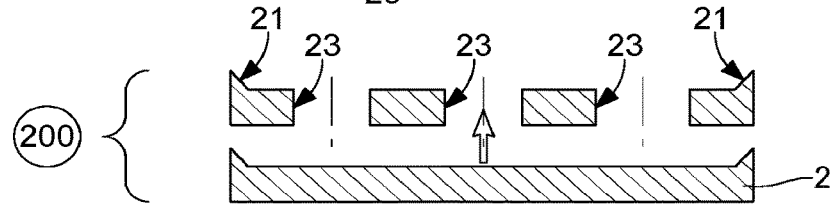
Figure 3:
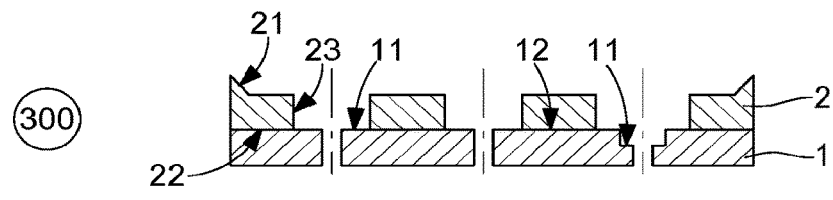
Figure 4:
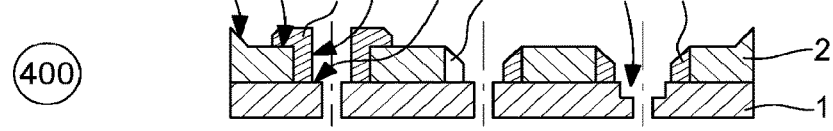
Figure 5:
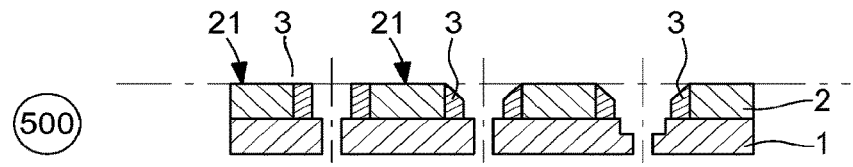
Figure 6:
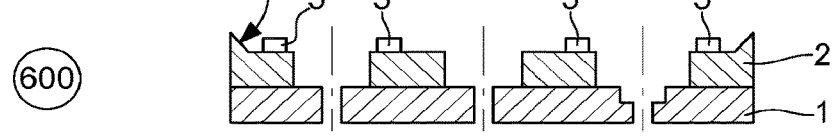
Figure 7:
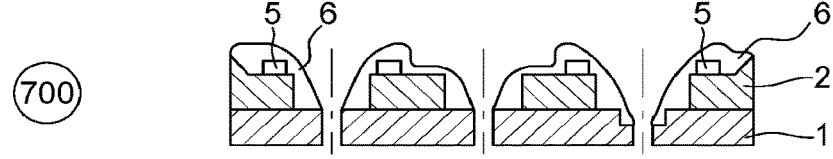
Figure 8:
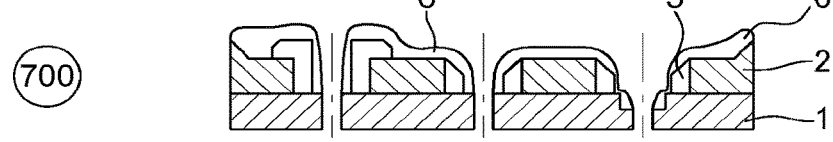
Figure 9:
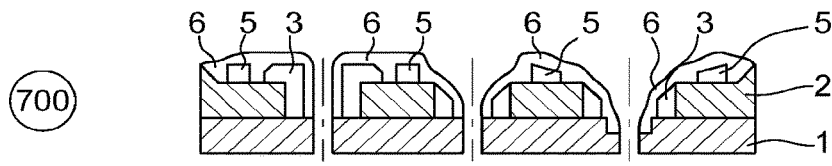
Figure 10:
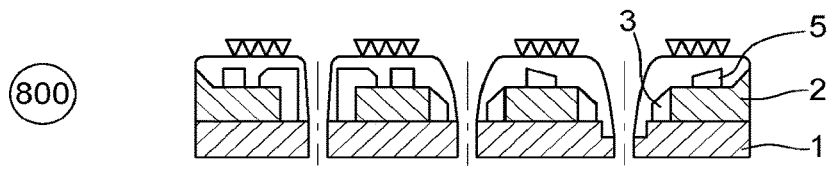
Figure 11:
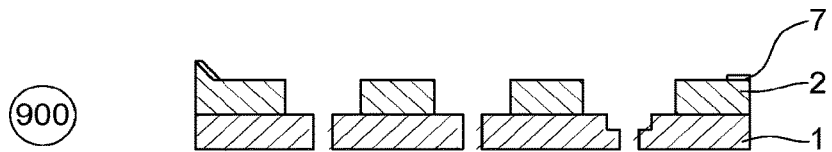
Figure 12:
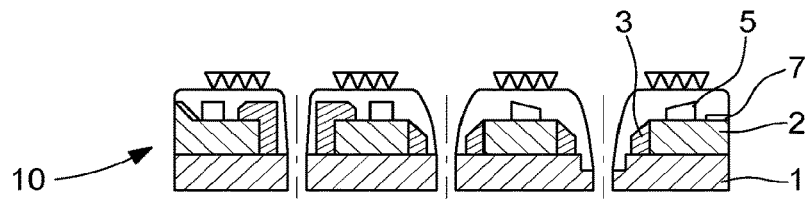
FIG. 12 represents, in a similar manner to FIG. 10, a final machining operation wherein shape machining operation is performed on the surface layer and/or a polishing operation is performed on the external surface of the surface layer which covers the inserts, decorative elements and the markings.
Figure 13:
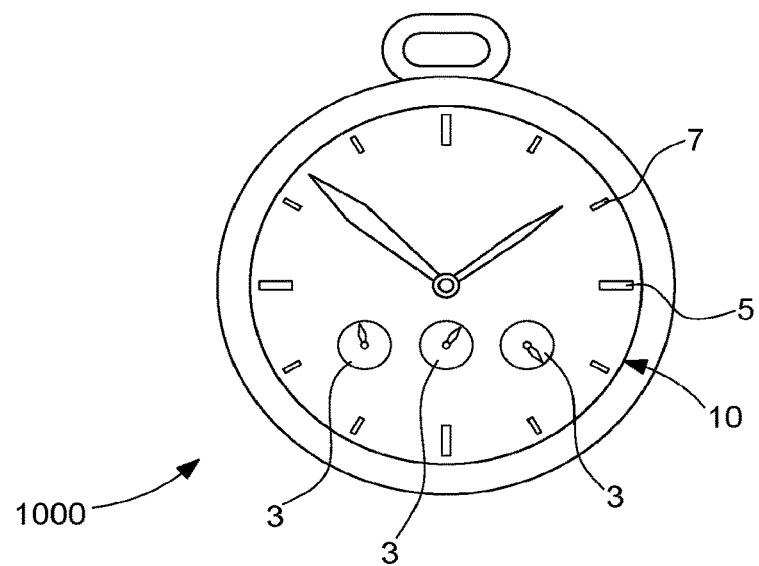
FIG. 13 represents a watch comprising a ceramic dial, with inserts at the bottom of which the ceramic remains visible under the hands of small chronograph counters, and which carries appliques and indices affixed according to the method of the invention.

The invention concerns a method for fabricating a composite component for horology or jewellery, characterized in that the following operations are performed in this order:

in an initial preparation operation 100, making:
 a base 1 from a first material, with at least a first apparent surface 11 intended to remain visible, and at least a first support surface 12;
 at least one structure 2 from a second ceramic material or sapphire or an at least partially amorphous material, with a second apparent surface 21 and at least a second support surface 22 complementary to a first support surface 12, and comprising at least one through bore 23 over the entire thickness of structure 2, or wherein at least one through bore 23 is machined over the entire thickness of structure 2 during a first machining operation 200;

at least one insert 3 made of a third material, for each through bore 23, and arranged to fit together in a complementary manner with through bore 23;

in a first assembly operation 300, bonding base 1 and each structure 2 to each other, with each first support surface 12 and each second complementary support surface 22 bearing against one another;

in a second assembly operation 400 securing each insert 3 with its respective through bore 23;

For example, such an insert 3 delimits a small counter on a dial, or a window frame, or similar.

According to a particular feature, after the second assembly operation 400, a second machining operation 500 is performed with shape machining operation of the upper surfaces of inserts 3 to align them on a same plane.

According to a particular feature, during the initial preparation operation 100, each structure 2 is made with the same thickness, and, during the second machining operation 500, the upper surfaces of inserts 3 are aligned on a same plane, particularly formed by second apparent surfaces 21 of structure 2, or of structures 2, when these second apparent surfaces 21 are aligned.

According to a particular feature, before execution of the first assembly operation 300, a first coating operation 500 is performed on at least each first apparent surface 11 by applying a first layer 4 of a fourth material.

According to a particular feature, after first assembly operation 300 or after second assembly operation 400, at least one transfer operation 600 is performed by affixing and bonding at least one decorative element 5 on at least a second apparent surface 21 comprised in at least one structure 2.

According to a particular feature, after at least one transfer operation 600, a final coating operation 700 is performed wherein structure 2 and each decorative element 5 carried by structure 2 are coated with a surface layer deposition 6 of a transparent treatment material in a PVD or lacquering or zapon varnishing process.

According to a particular feature, after second assembly operation 400, a final coating operation 700 is performed wherein at least each structure 2 and each insert 3 carried by structure 2 are coated with a surface layer deposition 6 of a transparent treatment material in a PVD or lacquering or zapon varnishing process.

According to the invention, during initial preparation operation 100, at least one stepped insert 3 is made to abuttingly engage both with a through bore 23 and with the second apparent surface 21 provided in structure 2 which carries insert 3, like the insert shown on the left in the Figures. This configuration makes it possible to conceal any chips resulting from the machining of through bores 23, which may occur during a water jet cutting or laser machining process.

According to a particular feature, during initial preparation operation 100, a metal material, in particular but not exclusively a copper alloy, is chosen, for example brass, as the first material of base 1.

According to a particular feature, during initial preparation operation 100, a ceramic is chosen as the first material of base 1.

According to a particular feature, during initial preparation operation 100, a gold alloy or a platinum alloy or a ceramic is chosen as the third material of at least one insert 3.

According to a particular feature, during first coating operation 500, a gold alloy or a platinum alloy is chosen as the fourth material.

According to a particular feature, after final coating operation 700, in a final machining operation 800, shape machining operation is performed on surface layer 6 and/or a polishing operation is performed on the external surface of surface layer 6.

According to a particular feature, after first assembly operation 300, at least one transfer operation 900 is performed in which at least one marking 7 is applied by pad printing to at least a second apparent surface 21 comprised in at least one structure 2.

According to a particular feature, during initial operation 100 at least one structure 2 is made with at least one machined receiving surface for receiving at least one decorative element 5 or a marking 7.

According to a particular feature, during initial operation 100 at least one structure 2 is made with at least one hollow housing for receiving an intermediate decoration layer in a coloured material different from the material of structure 2.

According to a particular feature, an acrylic or epoxy varnish is chosen as the material of surface layer 6.

According to a particular feature, an oxidation resistant material is chosen as the third material, or an oxidation resistant coating, or gold plating or rhodium plating is applied thereto. For example, at least one insert 3 is made of rhodium plated brass, or similar.

According to a particular feature, at least one apparent surface 11 is made to protrude, or is recessed or flush with respect to a first support surface 12.

The invention is illustrated in the Figures with a single base 1 and a single structure 2. It is clear that it can also be made with a single base carrying a plurality of structures 2, between which a decoration or a marking can be made to appear, such as under each through bore 23, or otherwise with a single structure 2 supported on several bases 1, for example for attachment to a plate or a case on either side of a space left free to accommodate other functions.

According to a particular feature, the timepiece component is fabricated to form an external element or a dial.

The invention also concerns a watch 1000 comprising at least one component for horology or jewellery made by the method according to the invention.

The invention also concerns a piece of jewellery including at least one jewellery component made by the method according to the invention.

The invention claimed is:

1. A method for fabricating a composite component for horology or jewellery, wherein the following steps are performed in this order:

in an initial preparation operation, making:
a base from a first material, the base including at least a first apparent surface intended to remain visible, and at least a first support upper surface;
at least one structure from a second ceramic material or sapphire or an at least partially amorphous material, with a second apparent surface and at least a second support surface complementary to said first support upper surface, and including a plurality of through bores formed through the entire thickness of said structure, or wherein a plurality of through bores are machined through the entire thickness of said structure during a first machining operation;

a plurality of inserts made of a third material, respectively for each said plurality of through bores, and arranged to fit together in a complementary manner with said through bores;

in a first assembly operation, bonding said base and each said structure to each other, with each said first support upper surface and each said second complementary support surface bearing against one another;

in a second assembly operation securing each said plurality of inserts with its respective through bore, wherein, during said initial preparation operation, a first insert of the plurality of inserts is made to abuttingly engage with a first through bore of said through bores, with the first support upper surface of the first apparent surface and with said second apparent surface provided in said structure which carries said insert, wherein, during said initial preparation operation, a second insert of the plurality of inserts is made to abuttingly engage only with a second through bore of the through bores and with the first support upper surface of the first apparent surface, such that an upper end of the second insert is formed along a same plane as an upper surface of the structure, and wherein, after said second assembly operation, a second machining operation is performed with geometrical alignment of the upper surfaces of said first insert and said second insert in order to align them on the same plane.

2. The method according to claim 1, wherein, during said initial preparation operation, each said structure is made with the same thickness, and wherein, during said second machining operation, said upper surfaces of said inserts are aligned on a same plane.

3. The method according to claim 1, wherein, before execution of said first assembly operation, a first coating operation is performed on at least each said first apparent surface by applying a first layer of a fourth material.

4. The method according to claim 1, wherein, after said first assembly operation or after said second assembly operation, at least one transfer operation is performed by affixing and bonding at least one decorative element on at least one said second apparent surface comprised in at least one said structure.

5. The method according to claim 4, wherein, after at least one said transfer operation, a final coating operation is perfoiiiied wherein said structure and each said decorative element carried by said structure are coated with a surface layer deposition of a transparent treatment material in a PVD or lacquering or zapon varnishing process.

6. The method according to claim 5, wherein an acrylic or epoxy varnish is chosen as the material of said surface layer.

7. The method according to claim 1, wherein, after said second assembly operation, a final coating operation is performed wherein at least each said structure and each said insert carried by said structure are coated with a surface layer deposition of a transparent treatment material in a PVD or lacquering or zapon varnishing process.

8. The method according to claim 7, wherein, after said final coating operation, in a final machining operation, shape machining operation is performed on said surface layer and/or a polishing operation is performed on the external surface of said surface layer.

9. The method according to claim 7, wherein an acrylic or epoxy varnish is chosen as the material of said surface layer.

10. The method according to claim 1, wherein, during said initial preparation operation, a copper alloy is chosen as said first material of said base.

11. The method according to claim 1, wherein, during said initial preparation operation, a ceramic is chosen as said first material of said base.

12. The method according to claim 1, wherein, during said initial preparation operation, a gold alloy or a platinum alloy or a ceramic is chosen as said third material of at least one said insert.

13. The method according to claim 3, wherein, during said first coating operation, a gold alloy or a platinum alloy is chosen as said fourth material.

14. The method according to claim 1, wherein, after said first assembly operation, at least one transfer operation is performed in which at least one marking is applied by pad printing to at least one said second apparent surface comprised in at least one said structure.

15. The method according to claim 1, wherein, during said initial operation at least one said structure is made with at least one machined receiving surface for receiving at least one decorative element or one marking.

16. The method according to claim 1, wherein, during said initial operation, at least one said structure is made with at least one hollow housing for receiving an intermediate decoration layer in a coloured material different from the material of said structure.

17. The method according to claim 1, wherein, an oxidation resistant material is chosen as said third material, or an oxidation resistant coating, or gold plating or rhodium plating is applied thereto.

18. The method according to claim 1, wherein at least one said apparent surface is made to protrude, or is recessed, or flush with respect to said first support surface.

19. The method according to claim 1, wherein said composite component is fabricated to form an external element or a dial.

* * * * *